C. REINKER.
AUTOMOBILE HEADLIGHT.
APPLICATION FILED AUG. 31, 1914.

1,152,219.

Patented Aug. 31, 1915.
2 SHEETS—SHEET 1.

WITNESSES:

INVENTOR
Christian Reinker
BY
Fisher & Moser
ATTORNEYS

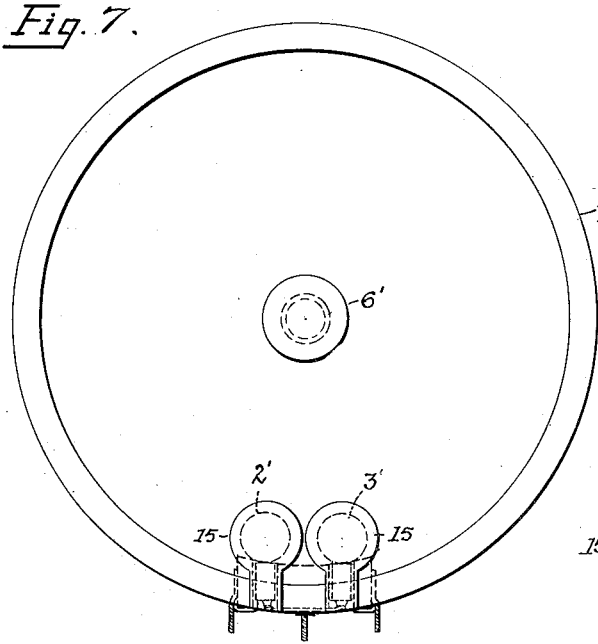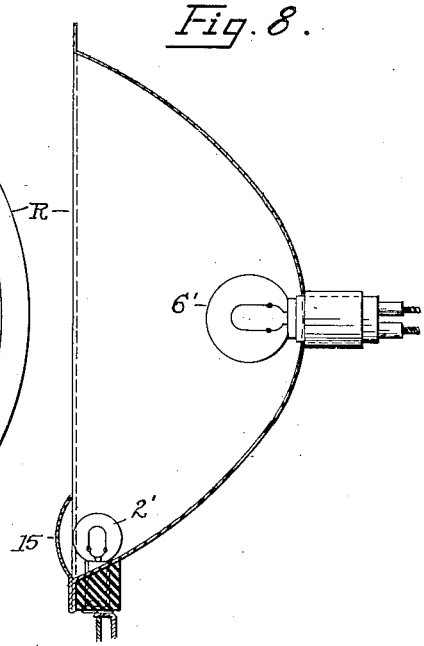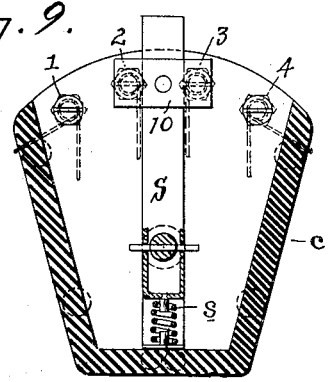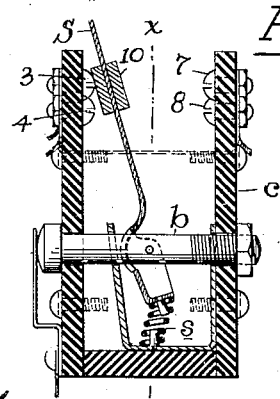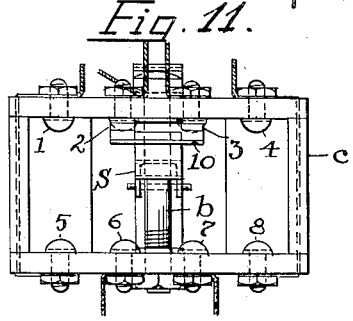

UNITED STATES PATENT OFFICE.

CHRISTIAN REINKER, OF LAKEWOOD, OHIO.

AUTOMOBILE-HEADLIGHT.

1,152,219.  Specification of Letters Patent.  Patented Aug. 31, 1915.

Application filed August 31, 1914. Serial No. 859,319.

*To all whom it may concern:*

Be it known that I, CHRISTIAN REINKER, a citizen of the United States, residing at Lakewood, in the county of Cuyahoga and State of Ohio, have invented certain new and useful Improvements in Automobile-Headlights, of which the following is a specification.

This invention has reference to an electrical illuminating system adapted, particularly, for use on automobiles and other power driven vehicles but not necessarily limited thereto, and for vehicles, the invention comprises means, first, to provide a dimmer light for use in towns and cities where brilliant head lights are prohibited, and to provide bright lights for country or suburban districts where a search light effect is desirable; secondly, to provide vari-colored lights with both high and low illumination, and thirdly, to provide a shielded light for both the dimmed and colored lamps.

In the accompanying drawings, Sheet 1 contains six different diagrammatic views intended to illustrate as many different combinations of lights and which correspond to the switch mechanism shown in Sheet 2. The said diagrams are hereinafter fully described, and Figure 7, Sheet 2, is a front elevation of a common form of lamp reflector having three several lamps mounted therein according to my system. Fig. 8 is a cross section of Fig. 7, front to rear. Fig. 9 is a sectional elevation on line $x-x$, Fig. 10, looking inward; Fig. 10 is a cross section of the switch at right angles to Fig. 9. Fig. 11 is a plan view of the switch as a whole.

Figure 1:
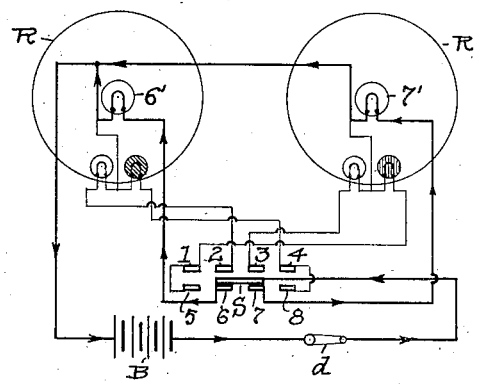
Figure 2:
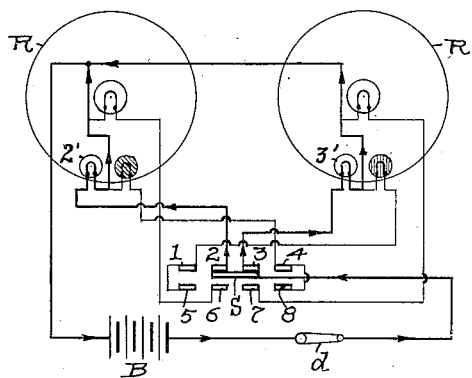
Figure 3:
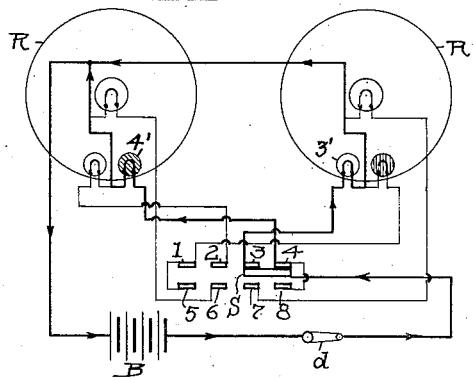
Figure 4:
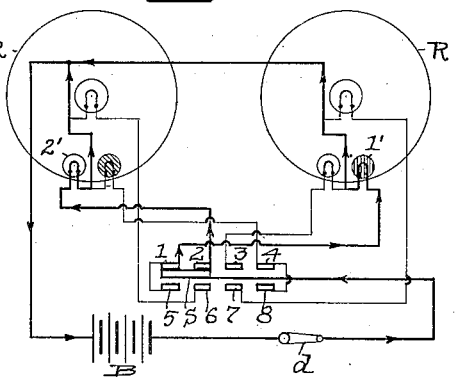
Figure 5:
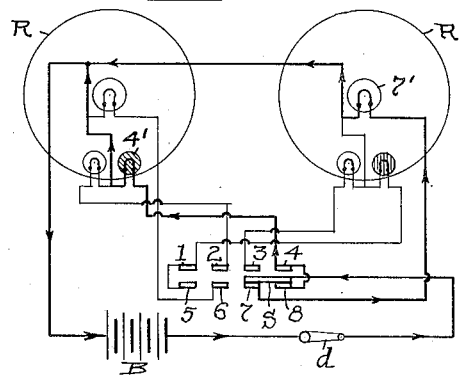
Figure 6:
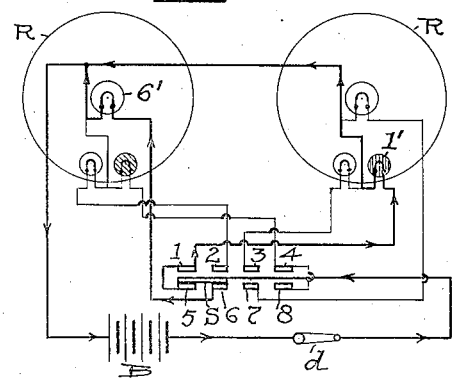

Referring, first, to the switch mechanism, we have a nonconducting or insulating casing $c$, say, of about the shape and proportion shown, and adapted to be placed within the convenient reach of the operator on the car or machine. The switch member proper, indicated by S, is pivoted on a cross rod or bolt $b$ of conducting material and rotatable in its bearings in the sides of casing $c$, so that, in effect, the said switch or lever S has a swivel or universal joint on and with the said bolt and can be moved to either side of the casing or toward either end thereof according to the particular contacts which are to be engaged. It will be noticed that the said casing has four contact points or terminals at each side, indicated by 1, 2, 3, 4, 5, 6, 7, and 8 respectively, but adapted always to be engaged in pairs. Thus, in Figs. 9 and 10, the switch is shown as in contact with the points 2 and 3 through its cross piece 10, which is of a length to overlap both said points or any other two or pair at the same time and thus bring at least one lamp in each reflector R into circuit. Of course, I might plan to make a single contact and thus reach only one lamp, but the system contemplates two head lights, one at each side of the vehicle, and the control of both by a single lever or switch member S. A spiral spring $s$ at the bottom of said switch member holds it in any adjusted contact, here or there, and until purposely changed. A switch $d$ in the electric circuit, serves to turn the current on or off the device, and the current flows from the battery through the switch mechanism and the lamps and back to the battery B or source of energy by the circuits seen particularly in Figs. 1 to 6. Now, having the complete device as herein shown, and assuming that the switch is on contacts 6 and 7, Fig. 1, we find that the two center lights 6' and 7' in the respective reflectors R are illuminated, see Fig. 1. This is the illumination for country travel. If the switch be thrown forward so as to contact with the points 2 and 3 directly opposite 6 and 7, the smaller or low power lamps 2' and 3' at the bottom of the respective reflectors will flow, see Fig. 2. Hence the points 2 and 3 serve for city work and the opposite points 6 and 7 for country work. This is convenient and easy to remember and certain in operation. Again, suppose that it is desirable to glow a red light along with a white light as an indication to persons approaching from the front that a turn of a corner or change in direction of travel is purposed, say to the left. In such case, the switch would make the red contact point 1 at the left of the series and the point 2 next thereto and the red light 1' and while light 2' of the other reflector would glow, see Fig. 4. Or, if the machine is to turn to the right, the points 3 and 4 would be contacted and the green light 4' and white light 3' would be glowed, see Fig. 3. Other combinations follow on the opposite side of the switch. Thus, by throwing the switch onto the points 5 and 6, the central lamp 6' on one side and the red light 1' on the other side are illuminated, see Fig. 6, and by throwing the switch onto points 7 and 8 the central lamp 7' and the green lamp 4' are illuminated, see Fig. 5. This gives the operator convenient command of every kind and combination of lights he may need and all through the operation of a single switch lever or member. Of course the lights are supposed to be used only at night when the machine is on the road and otherwise the current is cut off by the switch $d$ in the circuit.

The numerals 1, 2, 3, 4, 5, 6, 7 and 8 are placed on the several diagrammatic views so as to trace the circuits and connections therein and which correspond to the contacts of the same numerals in Fig. 11.

Although the red and green lamps are perfectly darkened and invisible at the front by their opaque shields 15, the color of the said lamp is distinctly reflected on the reflectors R so that there is no lack of color in the light although the lamp itself is invisible. There is no shield over the center lights 6 and 7.

It is to be especially noted that under my present arrangement of lamps and switches, only one lamp is glowed at a time in each reflector. It may be the central white light in one and the colored light in the other or the shielded white light in one and the colored light in the other. Or it may be both central lights, or both shielded white lights at the same time. In fact it will be one or the other until a turn to right or left is intended. Then the switch is shifted to bring in the colored light on the side of the turn and the white light on the other side, so that while there is a group of three lamps in a reflector only one lamp of the group is glowed in any case and the others remain dark.

The electric circuits to the respective lamps are clearly drawn and readable in the general Figs. 1 to 6 inclusive and presumably will not need to be further traced herein.

What I claim is:

1. A system of electric lighting for vehicles comprising a reflector and an unshielded lamp in the center thereof and a pair of shielded lamps at its edge, one of said lamps being colored.

2. An electric illuminating system for vehicles comprising a reflector and an unshaded lamp in the center thereof and a pair of shaded lamps in the edge of said reflector, combined with a switch adapted to throw any one of said lamps into the circuit at a time and to exclude the others.

3. In an electric illuminating system a pair of head lights and two shaded and one unshaded lamp in each light and one of said shaded lamps in each light colored, in combination with a switch adapted to throw one lamp in each light into the circuit at the same time.

4. In an electric illuminating system, a reflector and an unshaded lamp in the center thereof and a plurality of lamps in a group in the edge of said reflector and provided with shields and one of said group of lamps colored, in combination with a switch adapted to throw one of said group of lamps into the circuit at a time.

In testimony whereof I affix my signature in presence of two witnesses.

CHRISTIAN REINKER.

Witnesses:
F. J. GREER,
R. B. MOSER.